(12) United States Patent
Li

(10) Patent No.: US 12,085,821 B2
(45) Date of Patent: Sep. 10, 2024

(54) DISPLAY PANEL AND DISPLAY TERMINAL

(71) Applicant: TCL China Star Optoelectronics Technology Co., Ltd., Guangdong (CN)

(72) Inventor: Liang Li, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/600,138

(22) PCT Filed: Aug. 31, 2021

(86) PCT No.: PCT/CN2021/115506
§ 371 (c)(1),
(2) Date: Dec. 22, 2022

(87) PCT Pub. No.: WO2022/262120
PCT Pub. Date: Dec. 22, 2022

(65) Prior Publication Data
US 2024/0027855 A1    Jan. 25, 2024

(30) Foreign Application Priority Data
Jun. 16, 2021    (CN) ......................... 202110667657.3

(51) Int. Cl.
*G02F 1/1362*    (2006.01)
*G02F 1/1339*    (2006.01)
(52) U.S. Cl.
CPC ...... *G02F 1/136286* (2013.01); *G02F 1/1339* (2013.01); *G02F 1/1362* (2013.01)

(58) Field of Classification Search
None
See application file for complete search history.

(56) References Cited

U.S. PATENT DOCUMENTS

| | | | |
|---|---|---|---|
| 2010/0134745 A1 | 6/2010 | Lee et al. | |
| 2011/0134352 A1* | 6/2011 | Nakagawa | G02F 1/1345 349/43 |
| 2015/0277200 A1* | 10/2015 | Baek | G02F 1/1345 257/72 |
| 2016/0147096 A1* | 5/2016 | Wu | G02F 1/1339 361/679.01 |

(Continued)

FOREIGN PATENT DOCUMENTS

| | | |
|---|---|---|
| CN | 106468836 | 3/2017 |
| CN | 108153013 | 6/2018 |
| CN | 108666447 | 10/2018 |

(Continued)

*Primary Examiner* — Shan Liu

(57) ABSTRACT

A display panel and a display terminal are provided. The display panel includes a first base plate, a second base plate, and a frame sealing adhesive layer. An electrical connection component is disposed in the frame sealing adhesive layer. The first base plate includes a first type of signal line at least partially disposed in a non-display region and an elevated conductive part. The elevated conductive part is electrically connected to the first type of signal line. A first end of the electrical connection component is connected to the elevated conductive part, and a second end of the electrical connection component is connected to a common electrode layer of the second base plate.

15 Claims, 2 Drawing Sheets

(56) References Cited

U.S. PATENT DOCUMENTS

2019/0103420 A1* 4/2019 Liu ..................... H01L 27/1248
2020/0201099 A1* 6/2020 Feng .................... G06F 1/1647

FOREIGN PATENT DOCUMENTS

| | | | |
|---|---|---|---|
| CN | 109407414 | 3/2019 | |
| CN | 110161763 | 8/2019 | |
| CN | 112186021 | 1/2021 | |
| CN | 112558350 | 3/2021 | |
| JP | 2002-040463 | 2/2002 | |
| JP | 2002-207221 | 7/2002 | |
| JP | 2004-253303 | 9/2004 | |
| TW | 201437727 | 10/2014 | |
| WO | WO-2020103328 A1 * | 5/2020 | ........... G02F 1/1339 |

* cited by examiner

DISPLAY PANEL AND DISPLAY TERMINAL

RELATED APPLICATIONS

This application is a National Phase of PCT Patent Application No. PCT/CN2021/115506 having International filing date of Aug. 31, 2021, which claims the benefit of priority of Chinese Patent Application No. 202110667657.3 filed on Jun. 16, 2021. The contents of the above applications are all incorporated by reference as if fully set forth herein in their entirety.

FIELD AND BACKGROUND OF THE INVENTION

This application relates to the field of display panel technologies, and specifically, to a display panel and a display terminal.

In a liquid crystal display panel, a signal outputted from an integrated circuit board is usually conducted to a common electrode on a color filter base plate through a conductive metal ball after wiring of an array base plate. A hole needs to be dug on the array base plate to cause the conductive metal ball to be connected and conducted to a signal transmission line on the array base plate.

A surface dent is formed at a conduction position on the array base plate due to the hole. As a result, conductive metal balls of a same size are in different heights at the conduction position and a non-conduction position. If the conductive metal ball is in a relatively low height at the conduction position, there is likely a gap between the conductive metal ball and a common electrode layer on the color filter base plate, to cause poor contact. If the conductive metal ball is in a relatively high height at the non-conduction position, the conductive metal ball is likely to be crushed or overstretched, and resulting in peripheral mura. Based on the above, abnormal display is likely to occur in the display panel.

SUMMARY OF THE INVENTION

Conventional display panels have a technical problem of abnormal display due to poor contact between a conductive metal ball and a base plate or overstretching of the conductive metal ball.

This application provides a display panel and a display terminal, to alleviate the technical problem that abnormal display is likely to occur in the display panel.

In order to resolve the foregoing technical problem, this application provides the following technical solutions:

This application provides a display panel, comprising a display region and a non-display region located around a periphery of the display region, where
the display panel comprises a first base plate, a second base plate, and a frame sealing adhesive layer disposed between the first base plate and the second base plate, the frame sealing adhesive layer is located in the non-display region of the display panel, and an electrical connection component is disposed in the frame sealing adhesive layer, where
the first base plate comprises a first type of signal line at least partially disposed in the non-display region and an elevated conductive part disposed on the first type of signal line, the elevated conductive part is electrically connected to the first type of signal line, a first end of the electrical connection component is connected to the elevated conductive part, and a second end of the electrical connection component is connected to a common electrode layer of the second base plate.

In the display panel of this application, the first base plate comprises an array driving layer, a planarization layer disposed on the array driving layer, and a pixel electrode layer disposed on the planarization layer.

In the display panel of this application, the first type of signal line and the elevated conductive part are arranged in a same layer with the array driving layer.

In the display panel of this application, the array driving layer comprises a gate layer and a source/drain layer located on the gate layer, and the first type of signal line is arranged in a same layer with the gate layer.

In the display panel of this application, the elevated conductive part comprises a first conductive layer arranged in a same layer with the source/drain layer.

In the display panel of this application, the elevated conductive part further comprises a second conductive layer located on the first conductive layer.

In the display panel of this application, the second conductive layer electrically connects the first conductive layer to the first type of signal line.

In the display panel of this application, the first base plate further comprises a second type of signal line located in the non-display region, and the first type of signal line is arranged in a same layer with the second type of signal line.

In the display panel of this application, the electrical connection component comprises a first conductive metal ball corresponding to the first type of signal line and a second conductive metal ball corresponding to the second type of signal line.

In the display panel of this application, the second conductive metal ball is insulated from the second type of signal line.

In the display panel of this application, a size of the first conductive metal ball in a first direction is less than or equal to a size of the second conductive metal ball in the first direction, and the first direction is parallel to a thickness direction of the display panel.

In the display panel of this application, the first conductive layer comprises a first metal wire corresponding to the first type of signal line and a second metal wire corresponding to the second type of signal line.

In the display panel of this application, the first metal wire and the second metal wire are arranged side by side or in a crisscross manner.

In the display panel of this application, the first metal wire is insulated from the second metal wire.

In the display panel of this application, a thickness of the planarization layer in the non-display region is less than or equal to a thickness of the planarization layer in the display region.

In the display panel of this application, the first type of signal line comprises a first connection segment and a second connection segment, the first connection segment is located in the display region of the display panel, and the second connection segment is located in the non-display region of the display panel.

In the display panel of this application, the first connection segment is made of transparent conductive metal.

In the display panel of this application, the frame sealing adhesive layer further comprises a plurality of spacers.

In the display panel of this application, sizes of the spacers are the same as a size of at least part of the electrical connection component.

This application further provides a display terminal, comprising a terminal body and the foregoing display panel.

In this application, the elevated conductive part is disposed on the first type of signal line, and then the electrical connection component is disposed on the elevated conductive part. Therefore, the common electrode layer on the second base plate can be connected to the first type of signal line on the first base plate through the electrical connection component and the elevated conductive part, thereby implementing conduction of the upper and lower base plates. A concave part on the first base plate is elevated through the elevated conductive part. Therefore, the electrical connection component at the conduction position and the electrical connection component at the non-conduction position of the upper and lower base plates are similar in size. As a result, poor contact of the electrical connection component at the conduction position or overstretching of the electrical connection component at the non-conduction position in the display panel is reduced, thereby effectively alleviating abnormal display of the display panel.

BRIEF DESCRIPTION OF THE SEVERAL VIEWS OF THE DRAWINGS

To describe technical solutions in embodiments of this application more clearly, the following briefly introduces the accompanying drawings required for describing the embodiments. Apparently, the accompanying drawings in the following descriptions show only some embodiments of this application, and a person skilled in the art may still derive other accompanying drawings from these accompanying drawings without creative efforts.

Figures 1, 2:
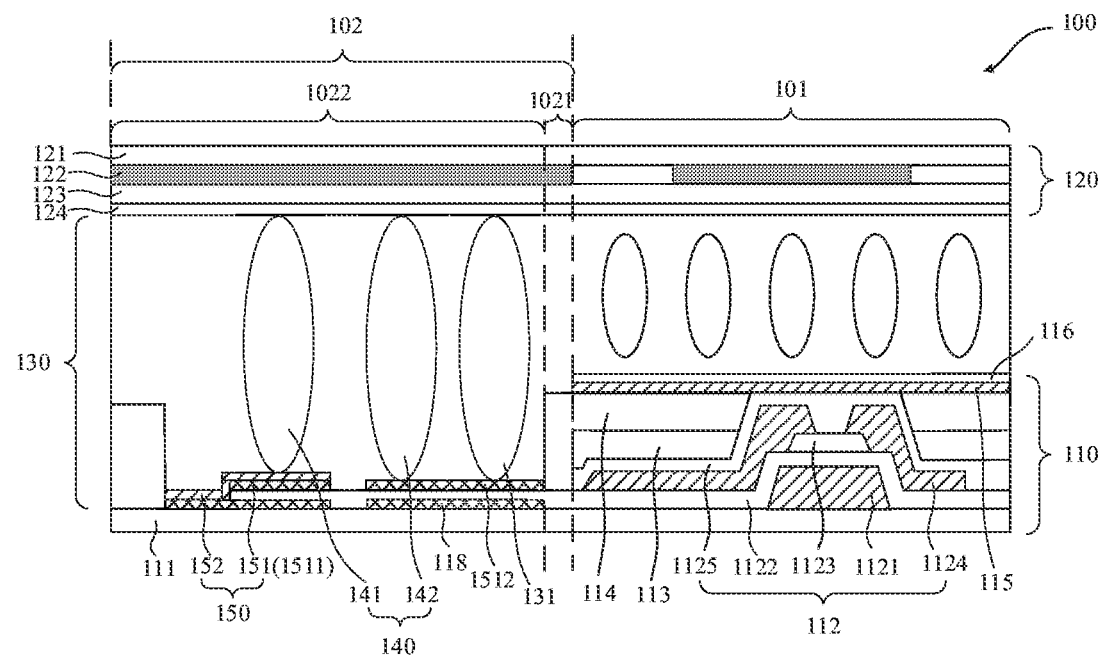
FIG. 1 is a schematic diagram of a first structure of a display panel according to this application.
FIG. 2 is a schematic diagram of a second structure of a display panel according to this application.

Description of the drawings: display panel 100, display region 101, non-display region 102, integrated circuit board 103, transition region 1021, conduction region 1022, first base plate 110, second base plate 120, frame sealing adhesive layer 130, electrical connection component 140, elevated conductive part 150, first substrate 111, array driving layer 112, color resist layer 113, planarization layer 114, pixel electrode layer 115, first alignment film layer 116, first type of signal line 117, second type of signal line 118, gate layer 1121, gate insulation layer 1122, active layer 1123, source/drain layer 1124, passivation layer 1125, second substrate 121, black matrix 122, common electrode layer 123, second alignment film layer 124, first conductive layer 151, second conductive layer 152, first conductive metal ball 141, second conductive metal ball 142, first metal wire 1511, second metal wire 1512, first connection segment 1171, second connection segment 1172, and spacer 131.

DESCRIPTION OF SPECIFIC EMBODIMENTS OF THE INVENTION

Technical solutions in embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

The embodiments of this application provide a display panel and a display terminal Detailed descriptions are separately provided below. It should be noted that a description sequence of the following embodiments is not intended to limit preference orders of the embodiments.

In a display panel, a signal outputted from an integrated circuit board is usually conducted to a common electrode on a color filter base plate through a conductive metal ball after wiring of an array base plate. A specific manner is to dig a hole on the array base plate and dispose the conductive metal ball at the hole. Therefore, the conductive metal ball and a signal transmission line on the array base plate are connected and conducted, and thus the electric signal on the array base plate is conducted to the color filter base plate.

However, a larger size of the display panel indicates a larger resistive-capacitive (RC) delay of wiring on a side of the array base plate away from the integrated circuit board. As a result, signal stability of the common electrode on the color filter base plate deceases. In order to improve the signal stability of the common electrode on the color filter base plate, a quantity of point positions of conductive metal balls is increased in a frame sealing adhesive between the array base plate and the color filter base plate, to improve a conduction capability of the upper and lower base plates.

However, the increase in the quantity of conductive metal balls has the following disadvantages: A surface dent is formed at a conduction position on the array base plate due to the hole. As a result, conductive metal balls of a same size are in different heights at the conduction position and a non-conduction position. If the conductive metal ball is in a relatively low height at the conduction position, there is likely a gap between the conductive metal ball and a common electrode layer on the color filter base plate, to cause poor contact. If the conductive metal ball is in a relatively high height at the non-conduction position, a distance between the array base plate at the non-conduction position and the color filter base plate reaches a compression limit of the conductive metal ball. As a result, the conductive metal ball is likely to be crushed or overstretched, thus causing peripheral mura. Based on the above, abnormal display is likely to occur in the display panel. Based on the foregoing technical problems, this application provides the following technical solutions.

Referring to FIG. 1 and FIG. 2, this application provides a display panel 100, including a display region 101 and a non-display region 102 located around a periphery of the display region 101.

The display panel 100 includes a first base plate 110, a second base plate 120, and a frame sealing adhesive layer 130 disposed between the first base plate 110 and the second base plate 120. The frame sealing adhesive layer 130 is located in the non-display region 102 of the display panel 100, and an electrical connection component 140 is disposed in the frame sealing adhesive layer 130.

In this embodiment, the first base plate 110 can include a first substrate 111, an array driving layer 112 disposed on the first substrate 111, a color resist layer 113 disposed on the array driving layer 112, a planarization layer 114 disposed on the color resist layer 113, a pixel electrode layer 115 disposed on the planarization layer 114, and a first alignment film layer 116 disposed on the pixel electrode layer 115.

The first substrate 111 can be made of glass, quartz, polyimide, or other materials.

The array driving layer 112 is a thin film transistor layer, and the thin film transistor layer may include a plurality of thin film transistors. The thin film transistor layer can be of etching stop type, back channel etching type, bottom-gate thin film transistor type, top-gate thin film transistor type, or other structures. This application does not make specific limitations. For example, the thin film transistor layer of bottom-gate thin film transistor type can include a gate layer 1121 located on the first substrate 111, a gate insulation layer 1122 located on the gate layer 1121, an active layer 1123 located on the gate insulation layer 1122, a source/drain layer 1124 located on the active layer 1123, and a passivation layer 1125 located on the source/drain layer.

In this embodiment, the color resist layer 113 can be a trichromatic color filter including red (R), green (G), and blue (B) or a tetrachromatic color filter including red (R), green (G), blue (B), and white (W).

The planarization layer 114 can include perfluoroalkoxy alkane (PFA) or silicon on glass (SOG).

The pixel electrode layer 115 can be a transparent conductive film layer, such as an indium tin oxide (ITO) or zinc oxide (ZnO)-based transparent conductive oxide (TCO) film, a multi-component TCO film, or a high-mobility TCO film.

The first alignment film layer 116 and a second alignment film layer 124 are polymers capable of controlling an arrangement direction of liquid crystals, such as polyimide.

In this embodiment, the second base plate 120 includes a second substrate 121, a black matrix 122 disposed on the second substrate 121, a common electrode layer 123 disposed on the black matrix 122, and the second alignment film layer 124 disposed on the common electrode layer 123.

The second substrate 121 is made of glass, quartz, polyimide, or other materials.

The black matrix 122 is made of a material including carbon black or chromium (Cr) and another promoter.

The common electrode layer 123 is a transparent conductive film layer, such as an ITO or ZnO-based TCO film, a multi-component TCO film, or a high-mobility TCO film.

The second alignment film layer 124 is a polymer capable of controlling an arrangement direction of liquid crystals, such as polyimide.

In this embodiment, the frame sealing adhesive layer 130 is made of epoxy resin or other materials.

In the display panel of this application, referring to FIG. 1 and FIG. 2, the first base plate 110 can further include a first type of signal line 117 at least partially disposed in the non-display region 102 and an elevated conductive part 150 disposed on the first type of signal line 117. The elevated conductive part 150 is electrically connected to the first type of signal line 117. A first end of the electrical connection component 140 is connected to the elevated conductive part 150, and a second end of the electrical connection component 140 is connected to the common electrode layer 123 of the second base plate 120.

In this application, the elevated conductive part 150 is disposed on the first type of signal line 117, and then the electrical connection component 140 is disposed on the elevated conductive part 150. Therefore, the common electrode layer 123 on the second base plate 120 can be connected to the first type of signal line 117 on the first base plate 110 through the electrical connection component 140 and the elevated conductive part 150, thereby implementing conduction of the upper and lower base plates. A concave part on the first base plate 110 is elevated through the elevated conductive part 150. Therefore, the electrical connection component 140 at the conduction position and the electrical connection component 140 at the non-conduction position of the upper and lower base plates are similar in size. As a result, poor contact of the electrical connection component 140 at the conduction position or overstretching of the electrical connection component 140 at the non-conduction position in the display panel 100 is reduced, thereby effectively alleviating poor contact or peripheral mura of the display panel 100.

In the display panel of this application, referring to FIG. 1 and FIG. 2, the first type of signal line 117 and the elevated conductive part 150 may be arranged in a same layer with the array driving layer 112.

In this embodiment, the first type of signal line 117, the elevated conductive part 150, and the array driving layer 112 are arranged in the same layer. Therefore, a bottom portion of the electrical connection component 140 can extend to a same height as a height of the planarization layer 114. As a result, the electrical connection component 140 is closer to a bottom height of a concave position in the non-display region 102, namely, bottom height differences of the electrical connection component 140 at different positions in the non-display region 102 are decreased. The electrical connection component 140 of a uniform and proper size is not likely to cause poor contact or overstretching in the non-display region 102, and the display panel 100 provides a better display effect.

In the display panel of this application, referring to FIG. 1 and FIG. 2, the first type of signal line 117 may be arranged in a same layer with the gate layer 1121. The elevated conductive part 150 may include a first conductive layer 151 arranged in a same layer with the source/drain layer 1124.

In this embodiment, the first type of signal line 117 is arranged in the same layer with the gate layer 1121, and the first conductive layer 151 is arranged in the same layer with the source/drain layer 1124. Therefore, metal wiring of the first type of signal line 117 and the gate layer 1121 can be performed synchronously, and the first conductive layer 151 and the source/drain layer 1124 are molded synchronously. Therefore, an additional wiring process or molding process is omitted, and a manufacturing process of the first base plate 110 is simpler. In addition, the first conductive layer 151 is arranged in the same layer with the source/drain layer 1124, so that the bottom portion of the electrical connection component connected to the first conductive layer 151 extends to be closer to the bottom height of the concave position. Namely, bottom height differences of the electrical connection component 140 at different positions in the non-display region 102 are decreased, thereby alleviating poor contact or overstretching.

In the display panel of this application, referring to FIG. 1 and FIG. 2, the elevated conductive part 150 may further include a second conductive layer 152 located on the first conductive layer 151. The second conductive layer 152 electrically connects the first conductive layer 151 to the first type of signal line 117.

The gate insulation layer 1122 is located between the first conductive layer 151 and the first type of signal line 117, namely, the gate insulation layer 1122 insulates the first conductive layer 151 from the first type of signal line 117.

The second conductive layer 152 covers the first type of signal line 117 and at least part of the first conductive layer 151.

In this embodiment, electrical conduction between the first type of signal line 117 and the first conductive layer 151 is implemented by using the second conductive layer 152 to cover both the first type of signal line 117 and at least part of the first conductive layer 151. Therefore, the electrical connection component 140 can conduct the upper and lower base plates at the second conductive layer 152 in two different heights, and there are more options for the size of the electrical connection component 140.

In the display panel of this application, referring to FIG. 1 and FIG. 2, the first base plate 110 can further include a second type of signal line 118 located in the non-display region 102, and the first type of signal line 117 is arranged in a same layer with the second type of signal line 118.

The first type of signal line 117 and the second type of signal line 118 on the first base plate 110 are configured to transmit independent electric signals of different circuits. In this embodiment, the first type of signal line 117 is arranged in the same layer with the second type of signal line 118. Therefore, the first type of signal line 117 and the second type of signal line 118 can be arranged simultaneously, improving wiring efficiency.

In this embodiment, the electrical connection component 140 may include a first conductive metal ball 141 corresponding to the first type of signal line 117 and a second conductive metal ball 142 corresponding to the second type of signal line 118.

Insulation between the first type of signal line 117 and the first conductive metal ball 141 and insulation between the second type of signal line 118 and the second conductive metal ball 142 are both implemented by using the gate insulation layer 1122.

In this embodiment, the electrical connection component 140 includes the first conductive metal ball 141 and the second conductive metal ball 142. Therefore, the first conductive metal ball 141 can conduct circuits of the upper and lower base plates at a position corresponding to the first type of signal line 117, and the second conductive metal ball 142 can support space in the display panel 100 at a position corresponding to the second type of signal line 118. The upper and lower base plates of the display panel 100 have better circuit connection stability and better structural supporting and reinforcing effects.

A size of the first conductive metal ball 141 in a first direction is less than or equal to a size of the second conductive metal ball 142 in the first direction, and the first direction is parallel to a thickness direction of the display panel 100.

In this embodiment, the size of the first conductive metal ball 141 in the first direction (parallel to the thickness direction of the display panel 100) is set to be less than or equal to the size of the second conductive metal ball 142 in the first direction. As a result, a sum of thickness of the second conductive layer 152 and the size of the first conductive metal ball 141 in the first direction is equal or close to the size of the second conductive metal ball 142 in the first direction, thereby alleviating poor contact or overstretching.

In the display panel of this application, the first conductive layer 151 may include a first metal wire 1511 corresponding to the first type of signal line 117 and a second metal wire 1512 corresponding to the second type of signal line 118.

The first type of signal line 117 and the second type of signal line 118 may be arranged side by side or in a crisscross manner. Correspondingly, the first metal wire 1511 and the second metal wire 1512 are arranged side by side or in a crisscross manner. Namely, when the first type of signal line 117 and the second type of signal line 118 are arranged side by side, the first metal wire 1511 and the second metal wire 1512 are arranged side by side as well. When the first type of signal line 117 and the second type of signal line 118 are arranged in a crisscross manner, the first metal wire 1511 and the second metal wire 1512 are arranged in a crisscross manner as well.

In this embodiment, a wiring relationship between the first metal wire 1511 and the second metal wire 1512 is the same as a wiring relationship between the first type of signal line 117 and the second type of signal line 118. As a result, a same wiring process may be adopted in a process of manufacturing the first base plate 110, and the manufacturing process of the first base plate 110 is simpler.

In this embodiment, the first metal wire 1511 can be insulated from the second metal wire 1512. The second conductive layer 152 can cover the first type of signal line 117 and the first metal wire 1511. In this embodiment, the first metal wire 1511 is insulated from the second metal wire 1512. As a result, the first metal wire 1511 has a circuit conducting effect on the first type of signal line 117, and the second metal wire 1512 has a supporting effect on the second type of signal line 118. The first metal wire 1511 and the second metal wire 1512 complement each other, improving the display effect and structural stability of the display panel 100.

In this embodiment, the first metal wire 1511 and the second metal wire 1512 may alternatively be conducted in circuit. The second conductive layer 152 covers the first type of signal line 117. In addition, the second conductive layer 152 further covers at least one of the first metal wire 1511 and the second metal wire 1512. In this embodiment, the first metal wire 1511 and the second metal wire 1512 are conducted in circuit. As a result, a conductive metal mesh is formed on the first conductive layer 151, to provide more conduction point positions for the electrical connection component 140. As the electrical connection component 140 has more options for point positions between the upper and lower base plates, the circuit conduction stability is better.

In the display panel of this application, referring to FIG. 1 and FIG. 2, a thickness of the planarization layer 114 in the non-display region 102 is less than or equal to a thickness of the planarization layer 114 in the display region 101.

In this embodiment, in order to form good transition between the non-display region 102 and the display region 101, the non-display region 102 can include a transition region 1021 and a conduction region 1022. The transition region 1021 is located around a periphery of the conduction region 1022 and connects the display region 101 to the conduction region 1022.

The thickness of the planarization layer 114 in the transition region 1021 can be equal to the thickness of the planarization layer 114 in the display region 101. The thickness of the planarization layer 114 in the conduction region 1022 can be less than the thickness of the planarization layer 114 in the display region 101, or the thickness of the planarization layer 114 in the conduction region 1022 is zero, for example, as shown in FIG. 1.

In this embodiment, the thickness of the planarization layer 114 in the conduction region 1022 is set to be less than the thickness of the planarization layer 114 in the display region 101, so as to select an elevated height of the elevated conductive part 150 and the size of the electrical connection component 140 according to depth of the concave position and the thickness of the planarization layer 114 in the conduction region 1022. As a result, the planarization layer 114 in the conduction region 1022 cooperates with the elevated conductive part 150 and the electrical connection component 140 to more stably conduct the upper and lower base plates, thereby improving display quality of the display panel 100.

Figure 3:
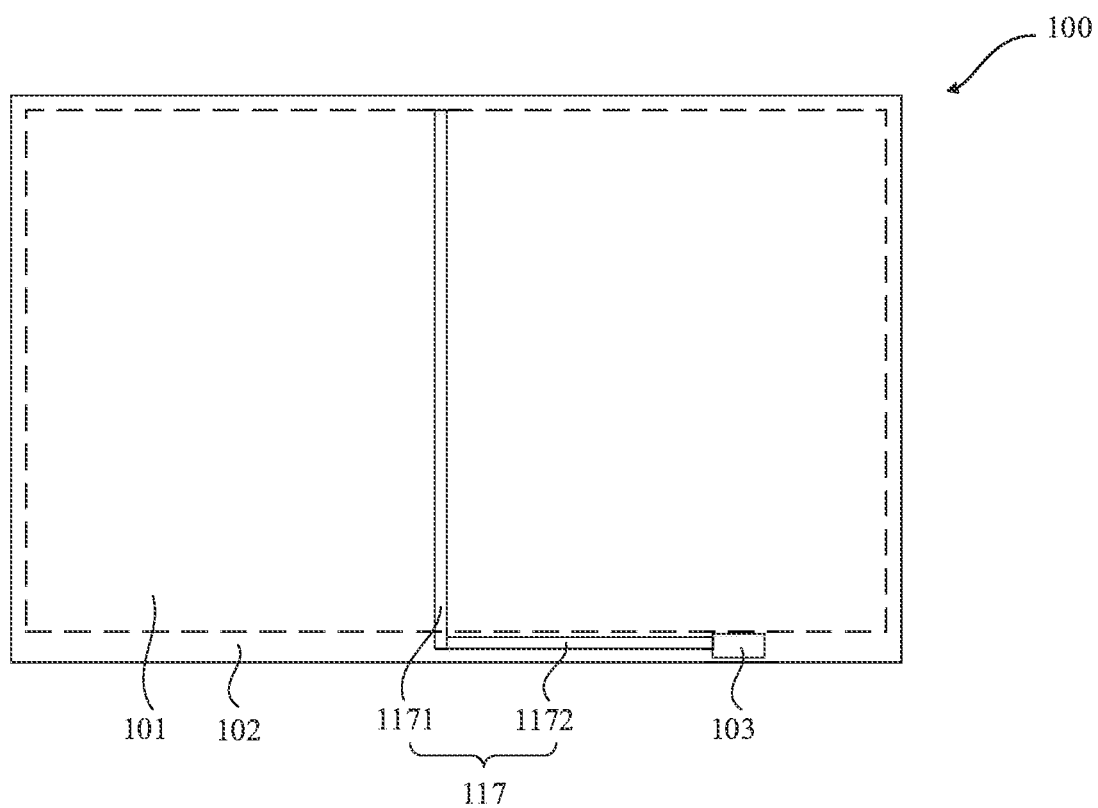
FIG. 3 is a wiring diagram of a first type of signal line in a display panel according to this application.

In the display panel of this application, referring to FIG. 3, the first type of signal line 117 can include a first connection segment 1171 and a second connection segment 1172, the first connection segment 1171 is located in the display region 101 of the display panel 100, and the second connection segment 1172 is located in the non-display region 102 of the display panel 100. The first connection segment 1171 is made of transparent conductive metal.

Currently, the first type of signal line 117 is usually arranged close to an edge position along the non-display region 102 on a peripheral side of the display panel 100. Therefore, a frame needs to be disposed on the peripheral side of the display panel 100, for the first type of signal line 117 to be arranged. In this embodiment, the first type of signal line 117 is divided into two segments, and the first connection segment 1171 made of transparent conductive metal is located in the display region 101 of the display panel 100. Therefore, the first type of signal line 117 does not need to bypass the display region 101 to be arranged at an edge of the non-display region 102 of the display panel 100. The first type of signal line 117 can directly cross the display region 101 and then connect to the integrated circuit board 103 at the edge of the non-display region 102. In addition, the transparent conductive metal basically does not affect normal display of the display region 101, reducing frame width of the display panel 100.

In the display panel of this application, the frame sealing adhesive layer 130 further includes a plurality of spacers 131. Sizes of the spacers 131 are the same as a size of at least part of the electrical connection component 140.

The spacers 131 can be fibrous microparticles or spherical microparticles. The spacers 131 can be made of melamine resin or urea resin or polystyrene resin or other materials.

In this embodiment, the plurality of spacers 131 is disposed in the frame sealing adhesive layer 130, further improving support stability and cell gap uniformity between the first base plate 110 and the second base plate 120. In addition, besides a good circuit conduction effect, the electrical connection component 140 can further implement good structural supporting, thereby further improving the display effect of the display panel 100.

This application further provides a display terminal, including a terminal body and the foregoing display panel 100.

In the embodiments of this application, the elevated conductive part 150 is disposed on the first type of signal line 117, and then the electrical connection component 140 is disposed on the elevated conductive part 150. Therefore, the common electrode layer 123 on the second base plate 120 can be connected to the first type of signal line 117 on the first base plate 110 through the electrical connection component 140 and the elevated conductive part 150, thereby implementing conduction of the upper and lower base plates. A concave part on the first base plate 110 is elevated through the elevated conductive part 150. Therefore, the electrical connection component 140 at the conduction position and the electrical connection component 140 at the non-conduction position of the upper and lower base plates are similar in size. As a result, poor contact of the electrical connection component 140 at the conduction position or overstretching of the electrical connection component 140 at the non-conduction position in the display panel 100 is reduced, thereby effectively alleviating abnormal display of the display panel 100.

A display panel and a display terminal provided in the embodiments of this application are described above in detail. Although the principles and implementations of this application are described by using specific examples in this specification, the descriptions of the foregoing embodiments are merely intended to help understand the method and the core idea of the method of this application. Meanwhile, a person skilled in the art may make modifications to the specific implementations and application range according to the idea of this application. In conclusion, the content of this specification is not construed as a limit on this application.

What is claimed is:

1. A display panel, comprising a display region and a non-display region located around a periphery of the display region, wherein
    the display panel comprises a first base plate, a second base plate, and a frame sealing adhesive layer disposed between the first base plate and the second base plate, the frame sealing adhesive layer is located in the non-display region of the display panel, and an electrical connection component is disposed in the frame sealing adhesive layer, wherein
    the first base plate comprises a first type of signal line at least partially disposed in the non-display region and an elevated conductive part disposed on the first type of signal line, the elevated conductive part is electrically connected to the first type of signal line, a first end of the electrical connection component is connected to the elevated conductive part, and a second end of the electrical connection component is connected to a common electrode layer of the second base plate;
    wherein the first base plate comprises an array driving layer, a planarization layer disposed on the array driving layer, and a pixel electrode layer disposed on the planarization layer;
    wherein the array driving layer comprises a gate layer and a source/drain layer located on the gate layer, and the first type of signal line is arranged in a same layer with the gate layer;
    wherein the elevated conductive part comprises a first conductive layer arranged in a same layer with the source/drain layer;
    wherein the first base plate further comprises a second type of signal line located in the non-display region, and the first type of signal line is arranged in a same layer with the second type of signal line; and
    wherein the first conductive layer comprises a first metal wire corresponding to the first type of signal line and a second metal wire corresponding to the second type of signal line.

2. The display panel according to claim 1, wherein the first type of signal line and the elevated conductive part are arranged in a same layer with the array driving layer.

3. The display panel according to claim 1, wherein the elevated conductive part further comprises a second conductive layer located on the first conductive layer.

4. The display panel according to claim 3, wherein the second conductive layer electrically connects the first conductive layer to the first type of signal line.

5. The display panel according to claim 1, wherein the electrical connection component comprises a first conductive metal ball corresponding to the first type of signal line and a second conductive metal ball corresponding to the second type of signal line.

6. The display panel according to claim 5, wherein the second conductive metal ball is insulated from the second type of signal line.

7. The display panel according to claim 5, wherein a size of the first conductive metal ball in a first direction is less than or equal to a size of the second conductive metal ball in the first direction, and the first direction is parallel to a thickness direction of the display panel.

8. The display panel according to claim 1, wherein the first metal wire and the second metal wire are arranged side by side or in a crisscross manner.

9. The display panel according to claim 8, wherein the first metal wire is insulated from the second metal wire.

10. The display panel according to claim 1, wherein a thickness of the planarization layer in the non-display region is less than or equal to a thickness of the planarization layer in the display region.

11. The display panel according to claim 1, wherein the first type of signal line comprises a first connection segment and a second connection segment, the first connection segment is located in the display region of the display panel, and the second connection segment is located in the non-display region of the display panel.

12. The display panel according to claim 11, wherein the first connection segment is made of transparent conductive metal.

13. The display panel according to claim 12, wherein the frame sealing adhesive layer further comprises a plurality of spacers.

14. The display panel according to claim 13, wherein sizes of the spacers are the same as a size of at least part of the electrical connection component.

15. A display terminal, comprising a terminal body and the display panel according to claim 1.

\* \* \* \* \*